(12) United States Patent
Heu

(10) Patent No.: US 8,427,765 B2
(45) Date of Patent: Apr. 23, 2013

(54) LARGE CALIBER STANDARD LENS

(75) Inventor: Min Heu, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 249 days.

(21) Appl. No.: 12/624,512

(22) Filed: Nov. 24, 2009

(65) Prior Publication Data

US 2010/0149663 A1 Jun. 17, 2010

(30) Foreign Application Priority Data

Dec. 17, 2008 (KR) .................. 10-2008-0128650

(51) Int. Cl.
*G02B 9/60* (2006.01)
*G02B 9/08* (2006.01)

(52) U.S. Cl.
USPC .......................... 359/765; 359/740

(58) Field of Classification Search .......... 359/763–765, 359/754–757
See application file for complete search history.

(56) References Cited

U.S. PATENT DOCUMENTS

| | | | |
|---|---|---|---|
| 281,397 A | 7/1883 | Renwick | |
| 2,116,264 A * | 5/1938 | Hasselkus et al. | ............ 359/765 |
| 2,744,447 A | 5/1956 | Berger et al. | |
| 2,748,656 A | 6/1956 | Berger et al. | |
| 2,799,207 A | 7/1957 | Lange | |
| 3,376,090 A | 4/1968 | Hudson | |
| 3,560,079 A * | 2/1971 | Wakimoto et al. | ............ 359/765 |
| 4,087,161 A | 5/1978 | Altman | |
| 4,094,588 A | 6/1978 | Nakagawa | |
| 4,101,203 A | 7/1978 | Yamaguchi | |
| 4,110,007 A | 8/1978 | Ikeda | |
| 4,154,509 A | 5/1979 | Takahashi | |
| 4,182,550 A | 1/1980 | Yamaguchi | |
| 4,264,138 A | 4/1981 | Imai | |
| 4,443,070 A | 4/1984 | Fujioka | |
| 4,448,497 A | 5/1984 | Wakamiya | |
| 4,514,052 A | 4/1985 | Yamaguchi | |
| 4,671,626 A | 6/1987 | Fukushima et al. | |
| 4,702,568 A | 10/1987 | Okudaira | |
| 5,796,529 A | 8/1998 | Park | |
| 5,930,056 A * | 7/1999 | Ohashi | ............ 359/776 |

(Continued)

FOREIGN PATENT DOCUMENTS

| | | |
|---|---|---|
| JP | 06-242370 A | 9/1994 |
| JP | 08-160293 A | 6/1996 |
| JP | 09-113964 A | 5/1997 |
| JP | 2001-051190 A | 2/2001 |

(Continued)

*Primary Examiner* — Jordan Schwartz
(74) *Attorney, Agent, or Firm* — Drinker Biddle & Reath LLP

(57) ABSTRACT

A large caliber standard lens having a first lens of a positive refractive power; a second lens of a negative refractive power; a diaphragm; a third lens of a negative refractive power; a fourth lens of a positive refractive power; and a fifth lens of a positive refractive power, wherein the lenses are arranged sequentially from an object side to an image side, and the first lens, the second lens, the third lens, and the fourth lens are meniscus lenses having concave surfaces facing the diaphragm and satisfy the following inequality, $$0.6 \leq \left|\frac{R_6}{R_4}\right| \leq 1.0$$

where $R_4$ represents the radius of curvature of the surface of the second lens facing the image, and $R_6$ represents the radius of curvature of the surface of the third lens facing the object.

5 Claims, 7 Drawing Sheets

U.S. PATENT DOCUMENTS

| | | | |
|---|---|---|---|
| 6,366,412 B1 * | 4/2002 | Noda et al. | 359/760 |
| 2002/0191169 A1 * | 12/2002 | Otomo | 355/67 |
| 2006/0285227 A1 * | 12/2006 | Kobayashi | 359/740 |

FOREIGN PATENT DOCUMENTS

JP  2003-241080 A  8/2003

* cited by examiner

LARGE CALIBER STANDARD LENS

CROSS-REFERENCE TO RELATED PATENT APPLICATION

This application claims the benefit of Korean Patent Application No. 10-2008-0128650, filed on Dec. 17, 2008, in the Korean Intellectual Property Office, the disclosure of which is incorporated herein in its entirety by reference.

BACKGROUND OF THE INVENTION

1. Field of the Invention

The present invention relates to a large caliber standard lens that may be used in single lens reflex (SLR) camera.

2. Description of the Related Art

Recently, cameras adopting an image sensor such as a charge coupled device (CCD) instead of using silver halide films have been widely used. Due to improvements in semiconductor integrating technology, high pixel count image sensors have been developed, and in response, lenses having excellent optical properties have been required. In addition, as demands of users for portable cameras increase, lenses having excellent optical properties and suitable for small sized cameras have been required.

Double Gauss type lenses or modifications thereof have been widely used as conventional bright standard lenses. Double Gauss type lenses have advantages in effectively compensating for spherical aberration by configuring symmetric optical systems with respect to an aperture diaphragm and increasing refractive power of a lens surface that faces the aperture diaphragm. However, double Gauss type lenses also have a disadvantage in occurring sagittal comatic flare.

To address the above disadvantage, configuration of a lens by restricting a radius of curvature of each lens and restricting refractive indexes and Abbe number of a lens material has been suggested. However, it is difficult to design a lens that may be fabricated easily while having excellent optical properties for high image quality.

SUMMARY OF THE INVENTION

The present invention provides a large caliber standard lens that has excellent optical properties, may be readily manufactured, and may be applied to a small size single lens reflex (SLR) camera.

According to an aspect of the present invention, there is provided a standard lens including: a first lens of a positive refractive power; a second lens of a negative refractive power; an aperture diaphragm; a third lens of a negative refractive power; a fourth lens of a positive refractive power; and a fifth lens of a positive refractive power, where the first lens, the second lens, the diaphragm, the third lens, the fourth lens, and the fifth lens may be arranged sequentially from an object side to an image side, and the first lens, the second lens, the third lens, and the fourth lens may be meniscus lenses having concave surfaces facing the diaphragm and satisfy the following inequality, $$0.6 \le \left|\frac{R_6}{R_4}\right| \le 1.0$$

where $R_4$ denotes the radius of curvature of the surface of the second lens facing the image side, and $R_6$ is the radius of curvature of the surface of the third lens facing the object.

Gaps may exist between each of the first through fifth lenses.

When refractive indexes of the third lens, the fourth lens, and the fifth lens are n3, n4, n5, respectively, the following inequality may be satisfied.

$$1.80 < (n3+n4+n5)/3$$

The standard lens may satisfy the following inequality, $$1.1 \le \frac{R_7}{R_8} < 3.5$$

where $R_7$ represents the radius of curvature of the surface of the third lens facing the image side, and $R_8$ represents the radius of curvature of the surface of the fourth lens facing the object side.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
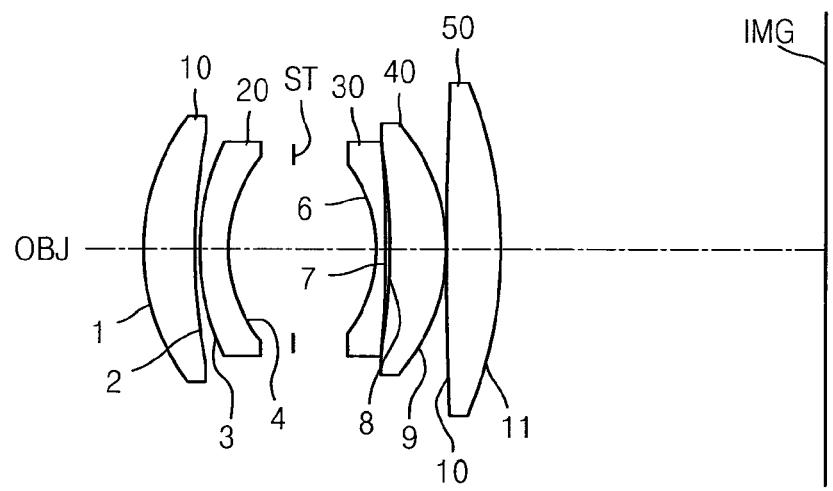
FIG. 1 is a diagram of a large caliber standard lens according to an embodiment of the present invention.

The present invention will now be described more fully with reference to the accompanying drawings, in which exemplary embodiments of the invention are shown. In the drawings, the thicknesses of layers and regions are exaggerated for clarity.

FIGS. 1, 3, 5, 7, 9, 11, and 13 are diagrams showing optical arrangements of standard lenses according to embodiments of the present invention. Referring to FIGS. 1, 3, 5, 7, 9, 11, and 13, the standard lenses includes a first lens 10, a second lens 20, an aperture diaphragm ST, a third lens 30, a fourth lens 40, and a fifth lens 50 that are arranged sequentially from an object side OBJ to an image side IMG. Gaps exist between the lenses, and the first through fourth lenses 10, 20, 30, and 40 are formed as meniscus lenses having concave surfaces facing the diaphragm ST.

The standard lenses according to the embodiments of the present invention provide an optical system of large caliber having a small aperture ratio; however, in this case, spherical aberration of the lens may be generated. When the radius of curvature of the lens surfaces that face the diaphragm are reduced in order to compensate for the spherical aberration efficiently, the spherical aberration may be compensated, but a large sagittal comatic flare is generated and the petzval sum is increased. In order to reduce the petzval sum, the surfaces of the second lens 20 facing the object side OBJ and the image IMG may have very small radii of curvature; however, such a second lens 20 may be difficult to manufacture.

The standard lenses of the present embodiments may satisfy the following inequality.

$$0.6 \le \left|\frac{R_6}{R_4}\right| \le 1.0 \quad (1)$$

where $R_4$ denotes the radius of curvature of the surface of the second lens 20 facing the image side IMG, and $R_6$ denotes the radius of curvature of the surface of the third lens 30 facing the object side OBJ.

The inequality (1) restricts the ratio between the radius of curvature of the surface of the second lens 20 facing the image side IMG and the radius of curvature of the surface of the third lens 30 facing the object side OBJ. When the value of $$\left|\frac{R_6}{R_4}\right|$$

is greater than 1.0, it is difficult to effectively compensate for the spherical aberration or it is difficult to manufacture the second lens. When the value of $$\left|\frac{R_6}{R_4}\right|$$

is smaller than 0.6, the symmetric property of the double gauss type lens is degraded, and accordingly, it is difficult to ensure excellent optical properties.

In addition, in the standard lenses of the present embodiments, the lenses that are arranged between the diaphragm ST and the image side IMG are formed of a material having a high refractive index in order to compensate for the petzval sum. For example, an average value of the refractive indexes of the lenses located between the diaphragm ST and the image side IMG may be greater than that of the refractive indexes of the lenses located between the diaphragm ST and the object side OBJ. In addition, the refractive indexes of the lenses located between the diaphragm ST and the image side IMG may be greater than the refractive indexes of the lenses located between the diaphragm ST and the object side OBJ.

According to the standard lenses of the present embodiments, refractive indexes n3, n4, and n5 of the third lens 30, the fourth lens 40, and the fifth lens 50, respectively, which are located between the diaphragm ST and the image side IMG may satisfy the following inequality.

$$1.80 < (n3+n4+n5)/3 \quad (2)$$

The above inequality suggests a range of the average refractive indexes of the third, fourth, and fifth lenses 30, 40, and 50. That is, in order to compensate for the petzval sum, the lenses located between the diaphragm ST and the image side IMG are formed of a high refractive material. It is difficult to compensate for the petzval sum sufficiently when the value of (n3+n4+n5)/3 does not satisfy the inequality (2).

In addition, the standard lenses according to the present embodiment may satisfy the following inequality.

$$1.1 \le \frac{R_7}{R_8} < 3.5 \quad (3)$$

where $R_7$ denotes the radius of curvature of the surface of the third lens 30 facing the image side IMG, and $R_8$ denotes the radius of curvature of the surface of the fourth lens 40 facing the object side OBJ. The inequality (3) restricts the ratio between the radius of curvature of the surface of the third lens 30 facing the image side IMG and the radius of curvature of the surface of the fourth lens 40 facing the object side OBJ, and effectively restricts the petzval sum and astigmatism by using the gap between the third lens 30 and the fourth lens 40. That is, the gap between the third lens 30 and the fourth lens 40 is formed so that the difference between the gap at a center portion of an optical axis and the gap at the peripheral portion of the optical axis becomes greater to compensate for the astigmatism. The gap between the third lens 30 and the fourth lens 40 may be formed to be greater at the center portion along the optical axis than at the peripheral portion away from the optical axis. When the value of $R_7/R_8$ is greater than 3.5, it is impracticable to compensate for the petzval sum, and when the value is smaller than 1.1, the difference between the gaps at the center portion of the optical axis and the peripheral portion of the optical axis is too small for compensation.

Hereinafter, detailed lens data of the standard lenses will be described according to embodiments of the present invention. In the embodiments, an aspheric surface (ASP) may be defined as follows.

$$x = \frac{c'y^2}{1+\sqrt{1-(K+1)c'^2y^2}} + Ay^4 + By^6 + Cy^8 + Dy^{10} \quad (4)$$

where x denotes the distance from the vertex of a lens in the optical axis direction, y denotes the distance perpendicular to the optical axis, K denotes a conic constant, A, B, C, and D are aspheric coefficients, and c' denotes a reciprocal of the radius of curvature at the vertex of the lens (=1/R).

Hereinafter, EFL denotes a synthetic focal distance of the entire standard lens, Fno denotes F number, and $2\omega$ denotes a viewing angle. In addition, ST denotes the diaphragm, and ASP denotes the aspheric coefficient of the corresponding surface.

First Embodiment

Figure 2:
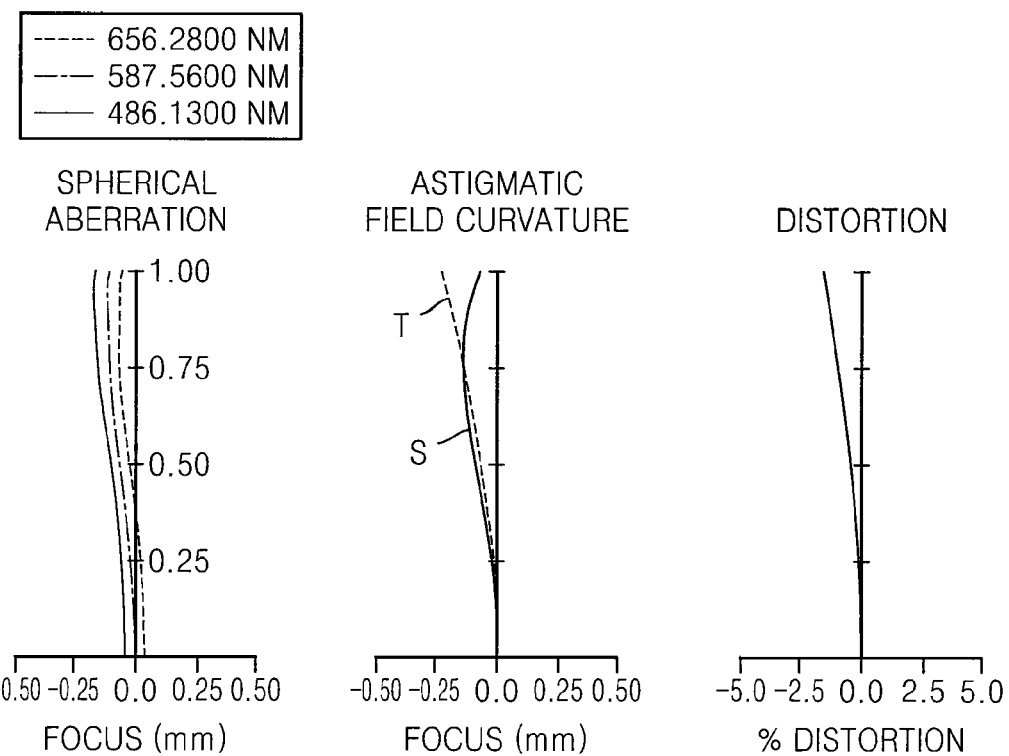
FIG. 2 is a diagram showing a spherical aberration in a longitudinal direction, a field curvature, and a distortion of the large caliber standard lens illustrated in FIG. 1.

FIG. 1 shows a structure of a standard lens according to a first embodiment of the invention, and FIG. 2 shows a spherical aberration in a longitudinal direction, an astigmatic field curvature, and a distortion of the standard lens according to the first embodiment. The spherical aberration is measured with respect to light having wavelengths of 656.28 (nm), 587.56 (nm), and 486.13 (nm), the astigmatic field curvature includes tangential field curvature (T) and sagittal field curvature (S) with respect to light having a wavelength of 587.56 (nm), and the distortion is measured with respect to light having a wavelength of 587.56 (nm).

The lens data of the first embodiment is as follows.

| EFL: 30.76 mm | Fno: 2.07 | 2ω: 50.66 | | |
|---|---|---|---|---|
| Surface | radius of curvature | thickness | refractive index ($n_d$) | Abbe's No. (vd) |
| 1 | 12.875 | 3.34 | 1.69680 | 55.5 |
| 2 | 35.400 | 0.29 | | |
| 3 | 13.830 | 1.85 | 1.68384 | 31.6 |
| 4* | 8.946 | 4.25 | | |
| ASP | | | | |
| K: 0.02 A: 1.107210e−005 B: 1.837000e−007 C: 0.000000e+000 | | | | |
| D: 0.000000e+000 | | | | |
| ST | Infinity | 5.40 | | |
| 6 | −8.300 | 0.65 | 1.78472 | 25.7 |
| 7 | −53.590 | 0.22 | | |
| 8 | −37.470 | 3.62 | 1.80420 | 46.5 |
| 9 | −11.763 | 0.12 | | |
| 10 | 206.300 | 3.50 | 1.88300 | 40.8 |
| 11 | −26.520 | 21.35 | | |
| IMG | | | | |

Second Embodiment

Figure 3:
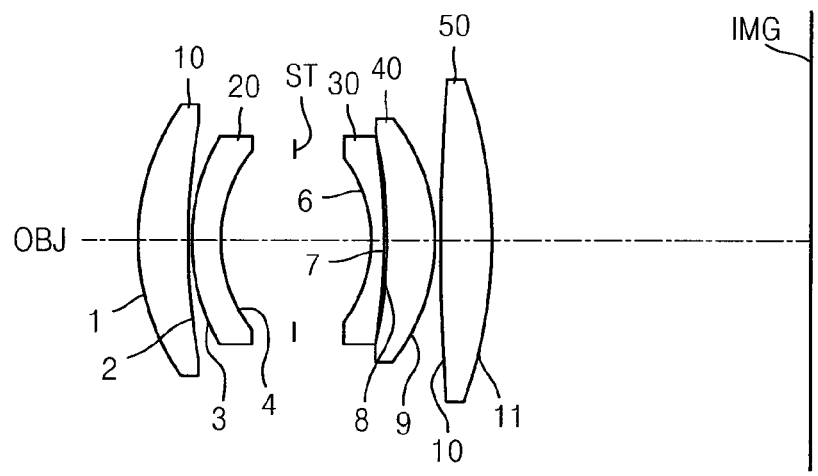
FIG. 3 is a diagram of a large caliber standard lens according to another embodiment of the present invention.
Figure 4:
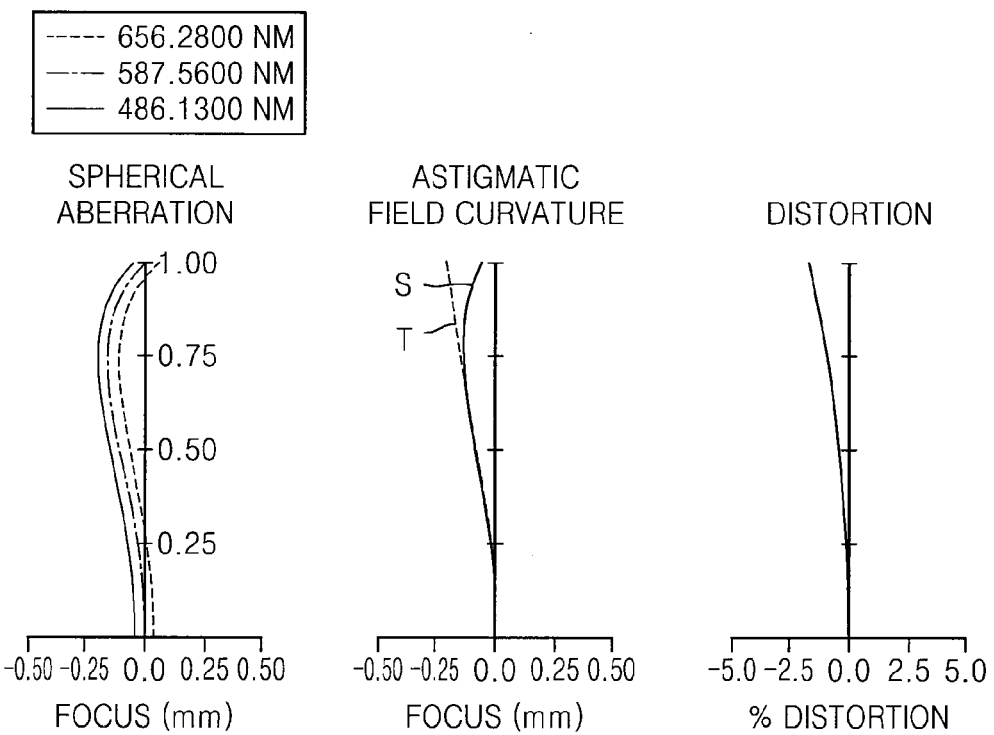
FIG. 4 is a diagram showing a spherical aberration in a longitudinal direction, a field curvature, and a distortion of the large caliber standard lens illustrated in FIG. 3.

FIG. 3 shows a structure of the standard lens according to a second embodiment, and FIG. 4 shows a spherical aberration in a longitudinal direction, an astigmatic field curvature, and a distortion of the standard lens according to the second embodiment. The spherical aberration is measured with respect to light having wavelengths of 656.28 (nm), 587.56 (nm), and 486.13 (nm), the astigmatic field curvature includes tangential field curvature (T) and sagittal field curvature (S) with respect to light having a wavelength of 587.56 (nm), and the distortion is measured with respect to light having a wavelength of 587.56 (nm).

The lens data of the second embodiment is as follows.

| EFL: 31.01 mm | Fno: 2.02 | 2ω: 50.22 | | |
|---|---|---|---|---|
| Surface | radius of curvature | thickness | refractive index ($n_d$) | Abbe's No. ($v_d$) |
| 1 | 14.080 | 3.25 | 1.69680 | 55.5 |
| 2 | 35.000 | 0.33 | | |
| 3 | 12.000 | 1.98 | 1.76182 | 26.6 |
| 4 | 8.680 | 5.00 | | |
| ST | Infinity | 5.07 | | |
| 6 | −8.530 | 0.90 | 1.84666 | 23.8 |
| 7 | −39.370 | 0.21 | | |
| 8 | −29.500 | 3.24 | 1.88300 | 40.8 |
| 9 | −11.690 | 0.33 | | |
| 10 | 147.500 | 3.46 | 1.88300 | 40.8 |
| 11 | −28.860 | 21.58 | | |
| IMG | | | | |

Third Embodiment

Figure 5:
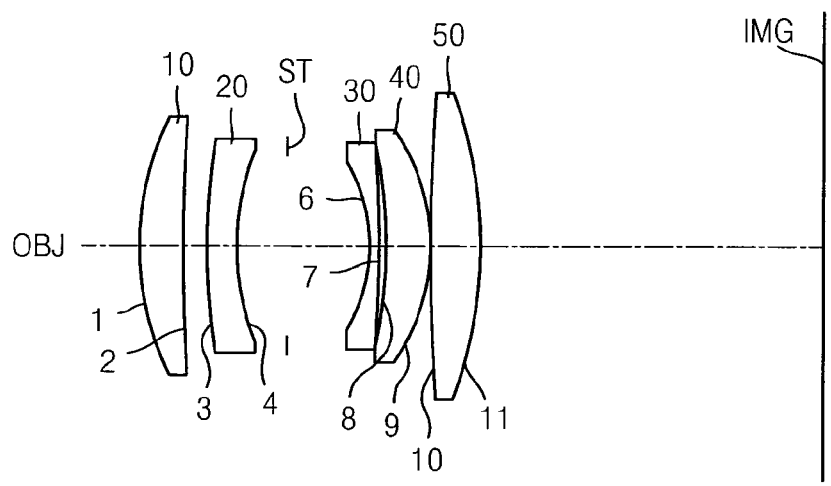
FIG. 5 is a diagram of a large caliber standard lens according to another embodiment of the present invention.
Figure 6:
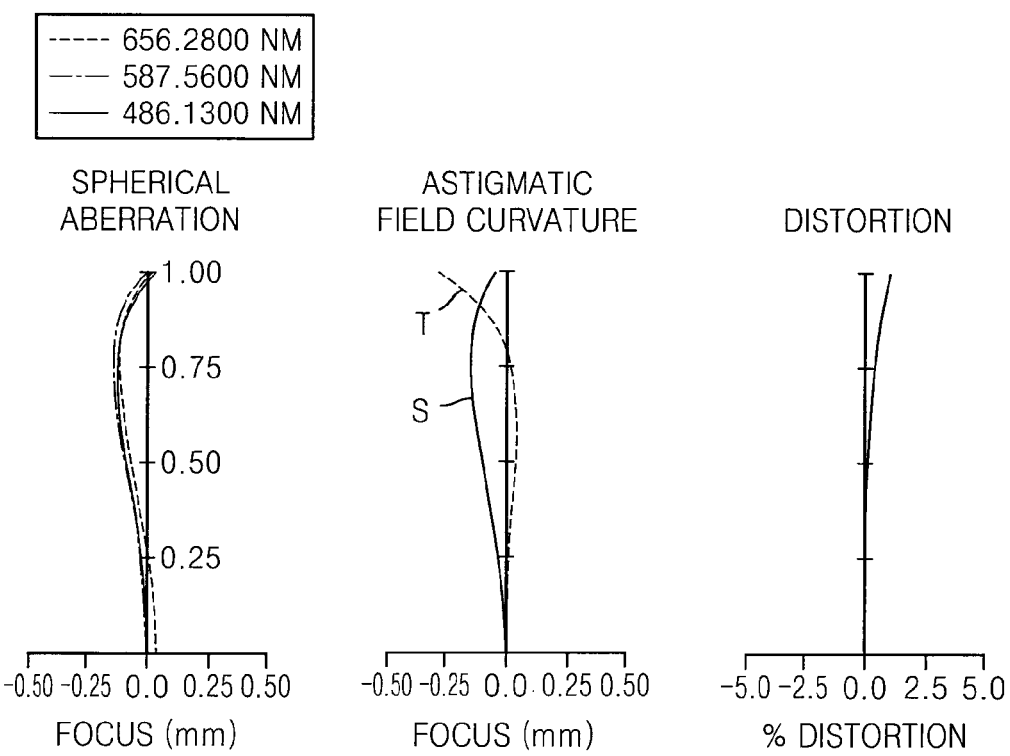
FIG. 6 is a diagram showing a spherical aberration in a longitudinal direction, a field curvature, and a distortion of the large caliber standard lens illustrated in FIG. 6.

FIG. 5 shows a structure of the standard lens according to a third embodiment, and FIG. 6 shows a spherical aberration in a longitudinal direction, an astigmatic field curvature, and a distortion of the standard lens according to the third embodiment. The spherical aberration is measured with respect to light having wavelengths of 656.28 (nm), 587.56 (nm), and 486.13 (nm), the astigmatic field curvature includes tangential field curvature (T) and sagittal field curvature (S) with respect to light having a wavelength of 587.56 (nm), and the distortion is measured with respect to light having a wavelength of 587.56 (nm).

The lens data of the third embodiment is as follows.

| EFL: 31.02 mm | Fno: 2.08 | 2ω: 49.13 | | |
|---|---|---|---|---|
| Surface | radius of curvature | thickness | refractive index ($n_d$) | Abbe's No. ($v_d$) |
| 1 | 17.559 | 2.85 | 1.75500 | 52.3 |
| 2 | 114.616 | 1.58 | | |
| 3 | 37.056 | 2.00 | 1.68893 | 31.1 |
| 4* | 15.901 | 3.31 | | |
| ASP | | | | |
| K: −2.995164 | | | | |
| A: 1.070950e−004 B: −7.887539e−008 C: 0.000000e+000 | | | | |
| D: 0.000000e+000 | | | | |
| ST | Infinity | 5.40 | | |
| 6 | −9.655 | 0.65 | 1.75211 | 25.0 |
| 7 | −81.458 | 0.47 | | |
| 8 | −29.213 | 2.84 | 1.83481 | 42.7 |
| 9 | −12.524 | 0.10 | | |
| 10 | 135.931 | 3.21 | 1.83481 | 42.7 |
| 11 | −25.720 | 22.72 | | |
| IMG | | | | |

Fourth Embodiment

Figure 7:
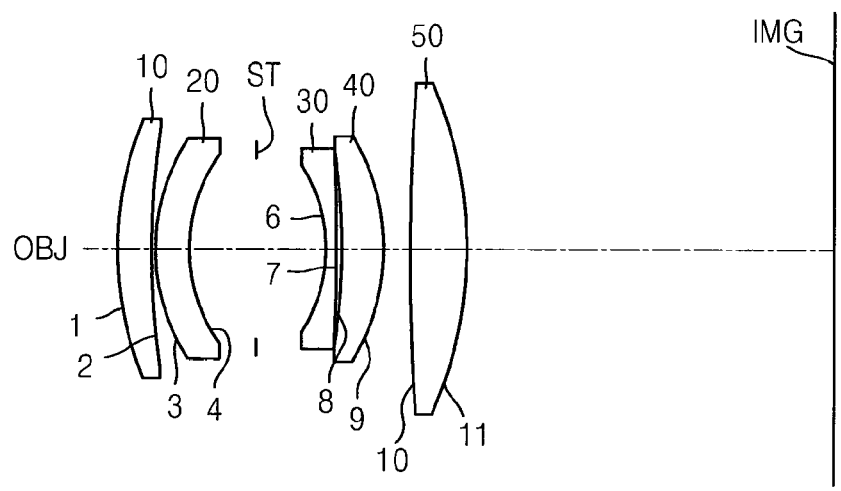
FIG. 7 is a diagram of a large caliber standard lens according to another embodiment of the present invention.
Figure 8:
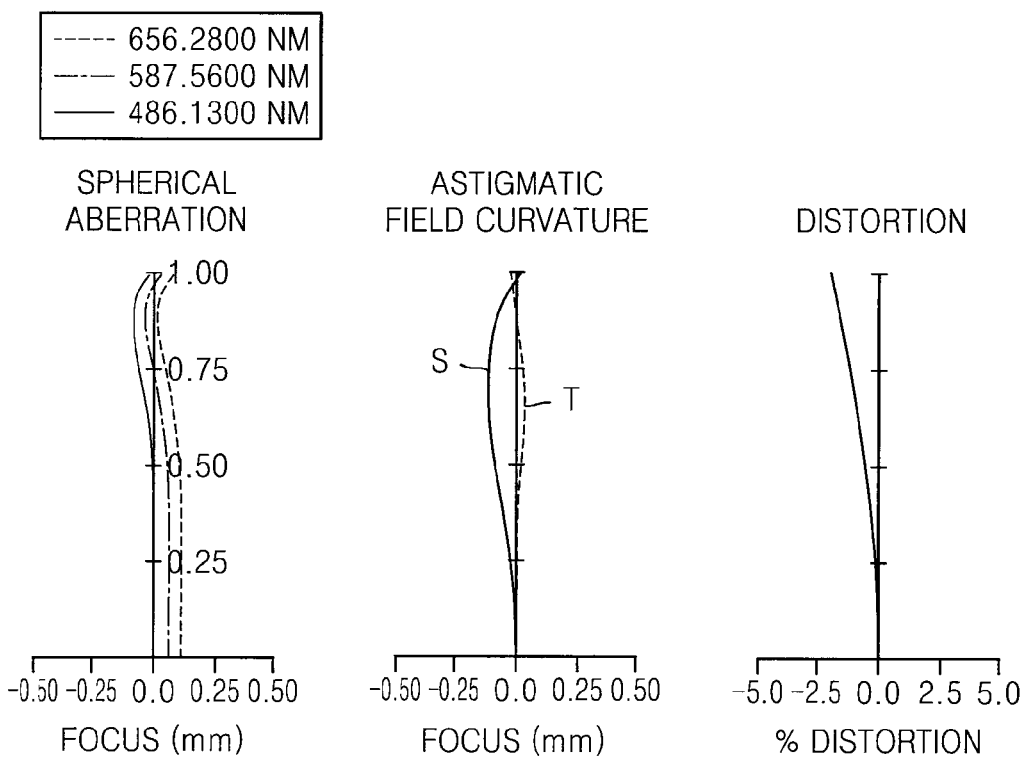
FIG. 8 is a diagram showing a spherical aberration in a longitudinal direction, a field curvature, and a distortion of the large caliber standard lens illustrated in FIG. 7.

FIG. 7 shows a structure of the standard lens according to a fourth embodiment, and FIG. 8 shows a spherical aberration in a longitudinal direction, an astigmatic field curvature, and a distortion of the standard lens according to the fourth embodiment. The spherical aberration is measured with respect to light having wavelengths of 656.28 (nm), 587.56 (nm), and 486.13 (nm), the astigmatic field curvature includes tangential field curvature (T) and sagittal field curvature (S) with respect to light having a wavelength of 587.56 (nm), and the distortion is measured with respect to light having a wavelength of 587.56 (nm).

The lens data of the fourth embodiment is as follows.

| EFL: 31.03 mm | Fno: 2.15 | 2ω: 50.24 | | |
|---|---|---|---|---|
| Surface | radius of curvature | thickness | Refractive index ($n_d$) | Abbe's No. ($v_d$) |
| 1 | 20.706 | 2.21 | 1.75500 | 52.3 |
| 2 | 55.099 | 0.21 | | |
| 3* | 11.913 | 2.20 | 1.80518 | 25.5 |
| ASP | | | | |
| K: −0.300000 | | | | |
| A: 2.633735e−005 B: 2.520640e−007 C: 2.773300e−009 | | | | |
| D: 0.000000e+000 | | | | |
| 4 | 9.730 | 4.37 | | |
| ST | Infinity | 4.56 | | |
| 6 | −9.488 | 0.65 | 1.78472 | 25.7 |
| 7 | −121.807 | 0.38 | | |
| 8 | −37.793 | 2.82 | 1.80420 | 46.5 |
| 9 | −12.520 | 1.63 | | |
| 10 | 142.166 | 3.68 | 1.83481 | 42.7 |
| 11 | −24.517 | 23.94 | | |
| IMG | | | | |

Fifth Embodiment

Figure 9:
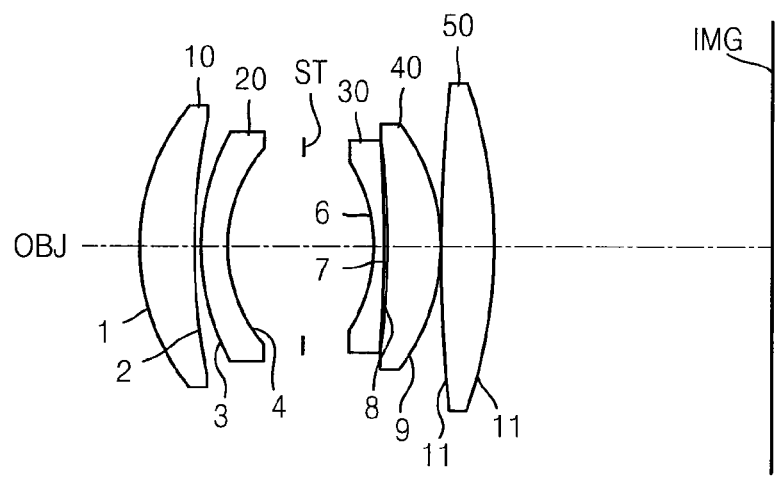
FIG. 9 is a diagram of a large caliber standard lens according to another embodiment of the present invention.
Figure 10:
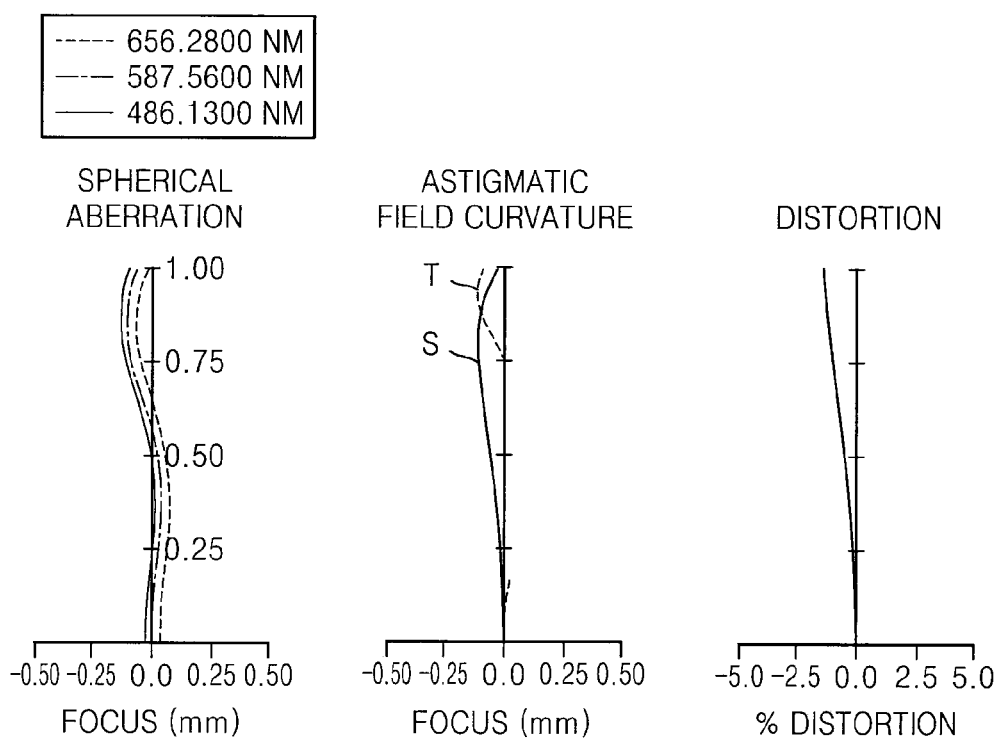
FIG. 10 is a diagram showing a spherical aberration in a longitudinal direction, a field curvature, and a distortion of the large caliber standard lens illustrated in FIG. 9.

FIG. 9 shows a structure of the standard lens according to a fifth embodiment, and FIG. 10 shows a spherical aberration in a longitudinal direction, an astigmatic field curvature, and a distortion of the standard lens according to the fifth embodiment. The spherical aberration is measured with respect to light having wavelengths of 656.28 (nm), 587.56 (nm), and 486.13 (nm), the astigmatic field curvature includes tangential field curvature (T) and sagittal field curvature (S) with respect to light having a wavelength of 587.56 (nm), and the distortion is measured with respect to light having a wavelength of 587.56 (nm).

The lens data of the fifth embodiment is as follows.

| EFL: 29.02 mm | Fno: 1.75 | 2ω: 52.97 | | |
|---|---|---|---|---|
| Surface | radius of curvature | thickness | refractive index ($n_d$) | Abbe's No. ($v_d$) |
| 1 | 13.874 | 3.67 | 1.75500 | 52.3 |
| 2 | 40.801 | 0.45 | | |
| 3* | 14.264 | 1.80 | 1.80518 | 25.5 |
| ASP | | | | |
| K: −3.596372 | | | | |
| A: 1.313547e−004 B: −2.479602e−007 C: −2.794144e−009 | | | | |
| D: 2.531811e−011 | | | | |
| 4 | 9.261 | 5.05 | | |
| ST | Infinity | 4.76 | | |
| 6 | −9.118 | 0.65 | 1.78472 | 25.7 |
| 7 | −73.332 | 0.20 | | |
| 8 | −47.241 | 3.56 | 1.88300 | 40.8 |
| 9 | −12.547 | 0.10 | | |
| 10 | 95.761 | 3.50 | 1.83481 | 42.7 |
| 11 | −30.761 | 18.84 | | |
| IMG | | | | |

Sixth Embodiment

Figure 11:
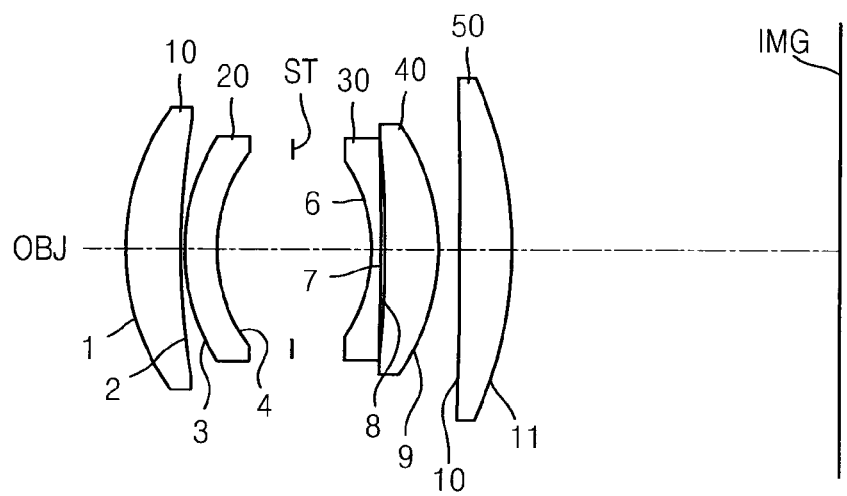
FIG. 11 is a diagram of a large caliber standard lens according to another embodiment of the present invention.
Figure 12:
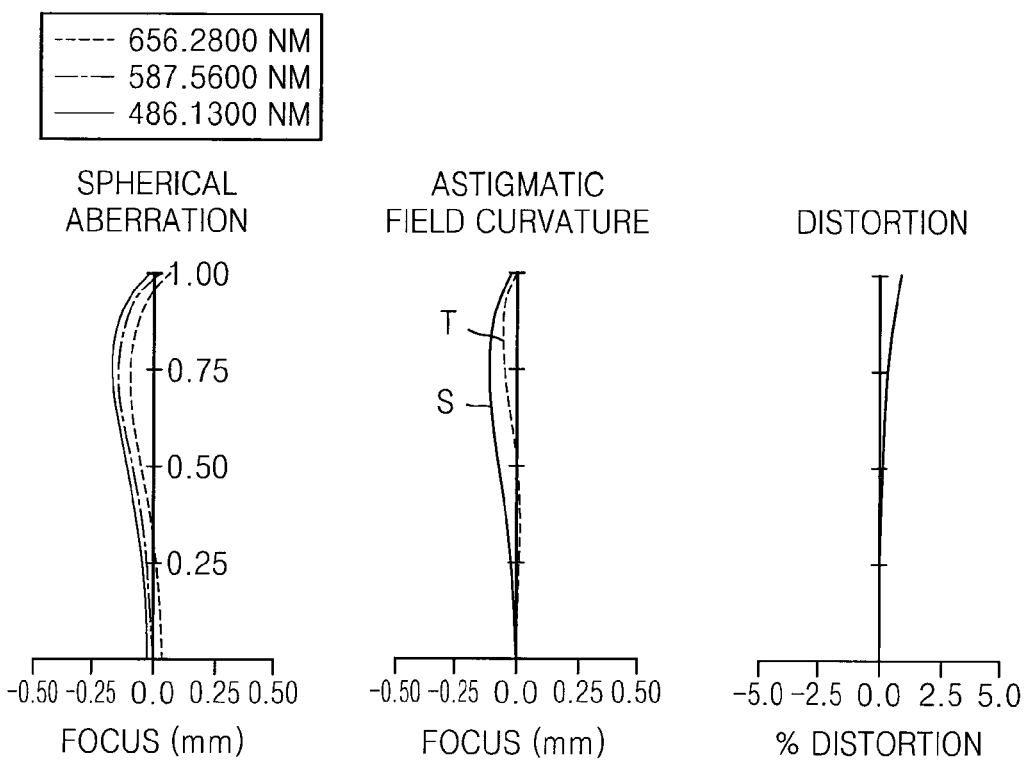
FIG. 12 is a diagram showing a spherical aberration in a longitudinal direction, a field curvature, and a distortion of the large caliber standard lens illustrated in FIG. 11.

FIG. 11 shows a structure of the standard lens according to a sixth embodiment, and FIG. 12 shows a spherical aberration in a longitudinal direction, an astigmatic field curvature, and a distortion of the standard lens according to the sixth embodiment. The spherical aberration is measured with respect to light having wavelengths of 656.28 (nm), 587.56 (nm), and 486.13 (nm), the astigmatic field curvature includes tangential field curvature (T) and sagittal field curvature (S) with respect to light having a wavelength of 587.56 (nm), and the distortion is measured with respect to light having a wavelength of 587.56 (nm).

The lens data of the sixth embodiment is as follows.

| EFL: 31.82 mm | Fno: 1.99 | 2ω: 47.90 | | |
|---|---|---|---|---|
| Surface | radius of curvature | thickness | refractive index ($n_d$) | Abbe's No. ($v_d$) |
| 1 | 14.891 | 3.47 | 1.70875 | 55.2 |
| 2 | 42.004 | 0.33 | | |
| 3 | 12.897 | 1.97 | 1.75211 | 25.0 |
| 4 | 9.206 | 5.08 | | |
| ST | Infinity | 5.08 | | |
| 6 | −9.077 | 0.66 | 1.80518 | 25.5 |
| 7 | −142.976 | 0.23 | | |
| 8 | −63.550 | 3.50 | 1.88300 | 40.8 |
| 9* | −13.119 | 1.30 | | |
| ASP | | | | |
| K: 0.464885 | | | | |
| A: 3.164547e−005 B: 9.715045e−008 C: 2.986636e−009 | | | | |
| D: 0.000000e+000 | | | | |
| 10 | −591.202 | 3.51 | 1.88300 | 40.8 |
| 11 | −23.755 | 21.44 | | |
| IMG | | | | |

Seventh Embodiment

Figure 13:
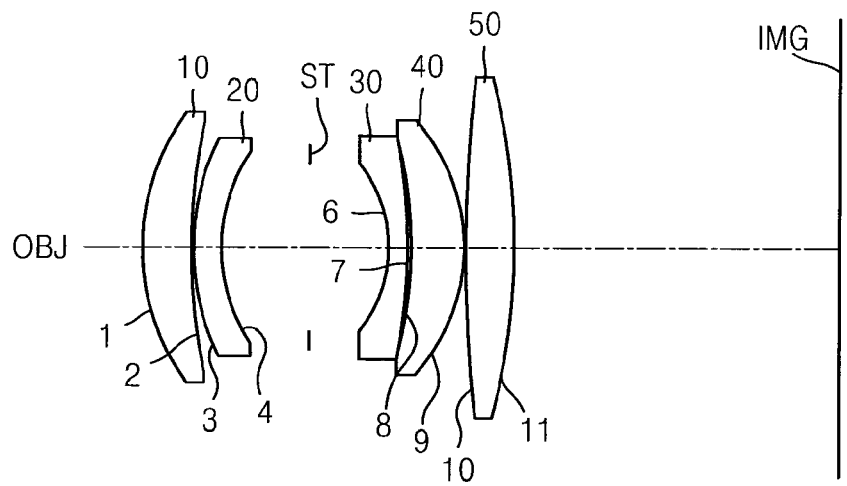
FIG. 13 is a diagram of a large caliber standard lens according to another embodiment of the present invention.
Figure 14:
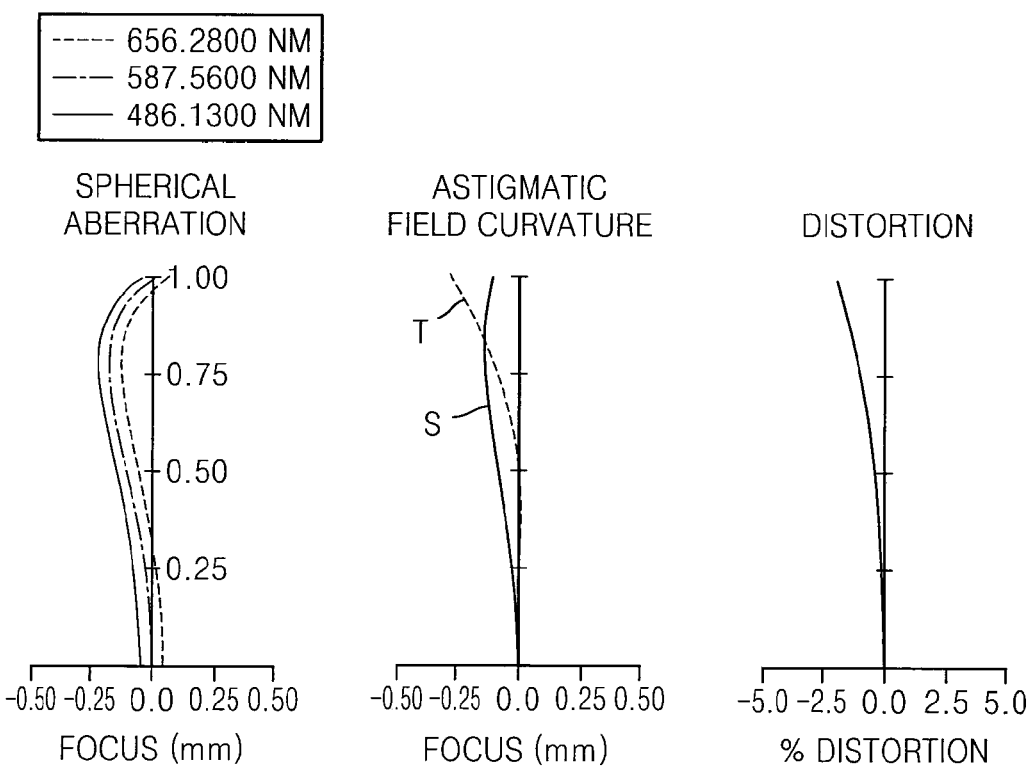
FIG. 14 is a diagram showing a spherical aberration in a longitudinal direction, a field curvature, and a distortion of the large caliber standard lens illustrated in FIG. 13.

FIG. 13 shows a structure of the standard lens according to a seventh embodiment, and FIG. 14 shows a spherical aberration in a longitudinal direction, an astigmatic field curvature, and a distortion of the standard lens according to the seventh embodiment. The spherical aberration is measured with respect to light having wavelengths of 656.28 (nm), 587.56 (nm), and 486.13 (nm), the astigmatic field curvature includes tangential field curvature (T) and sagittal field curvature (S) with respect to light having a wavelength of 587.56 (nm), and the distortion is measured with respect to light having a wavelength of 587.56 (nm).

The lens data of the seventh embodiment is as follows.

| EFL: 30.47 mm | Fno: 2.07 | 2ω: 51.12 | | |
|---|---|---|---|---|
| Surface | radius of curvature | thickness | refractive index ($n_d$) | Abbe's No. ($v_d$) |
| 1 | 13.881 | 3.17 | 1.69680 | 55.5 |
| 2 | 35.782 | 0.18 | | |
| 3 | 14.447 | 1.84 | 1.76182 | 26.6 |
| 4 | 10.329 | 5.65 | | |
| ST | Infinity | 5.07 | | |
| 6* | −8.345 | 1.31 | 1.84666 | 23.8 |
| ASP | | | | |
| K: 0.102629 | | | | |
| A: −3.210067e−006 B: 5.693900e−007 C: −6.398816e−009 | | | | |
| D: 0.000000e+000 | | | | |
| 7 | −32.042 | 0.20 | | |
| 8 | −26.702 | 3.39 | 1.88300 | 40.8 |
| 9 | −11.500 | 0.10 | | |
| 10 | 89.777 | 3.17 | 1.88300 | 40.8 |
| 11 | −37.708 | 18.83 | | |
| IMG | | | | |

Following table shows that the standard lenses of the above embodiments satisfy the inequalities 1 through 3.

TABLE 1

| | Inequality 1 | Inequality 2 | Inequality 3 |
|---|---|---|---|
| Embodiment 1 | 0.928 | 1.824 | 1.430 |
| Embodiment 2 | 0.983 | 1.871 | 1.335 |
| Embodiment 3 | 0.607 | 1.807 | 2.788 |
| Embodiment 4 | 0.975 | 1.808 | 3.223 |
| Embodiment 5 | 0.935 | 1.820 | 1.428 |
| Embodiment 6 | 0.986 | 1.857 | 2.250 |
| Embodiment 7 | 0.808 | 1.871 | 1.200 |

According to the standard lens according to the embodiments of the present invention, the lens structure can be readily manufactured and is advantageous for compensating aberrations.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A fixed focal length lens system comprising:
a first lens of a positive refractive power;
a second lens of a negative refractive power;
an aperture diaphragm;
a third lens of a negative refractive power;
a fourth lens of a positive refractive power; and
a fifth lens of a positive refractive power;
wherein:
the first lens, the second lens, the diaphragm, the third lens, the fourth lens, and the fifth lens are arranged sequentially from an object side to an image side;
the first lens, the second lens, the third lens, and the fourth lens are meniscus lenses having concave surfaces facing the diaphragm; and
the following inequalities are satisfied:

$$0.6 \leq \left|\frac{R_6}{R_4}\right| \leq 1.0$$

where $R_4$ denotes the radius of curvature of the surface of the second lens facing the image side, and $R_6$ is the radius of curvature of the surface of the third lens facing the object; and $$1.1 \leq \frac{R_7}{R_8} < 3.5$$

where $R_7$ represents the radius of curvature of the surface of the third lens facing the image side, and $R_8$ represents the radius of curvature of the surface of the fourth lens facing the object side;
wherein when refractive indexes of the third lens, the fourth lens, and the fifth lens are n3, n4, n5, respectively, the following inequality is satisfied:

1.80<(n3+n4+n5)/3.

2. A fixed focal length lens system comprising:
a first lens of a positive refractive power;
a second lens of a negative refractive power;
an aperture diaphragm;
a third lens of a negative refractive power;
a fourth lens of a positive refractive power; and
a fifth lens of a positive refractive power;
wherein:
the first lens, the second lens, the diaphragm, the third lens, the fourth lens, and the fifth lens are arranged sequentially with no intervening lens elements from an object side to an image side;
the first lens, the second lens, the third lens, and the fourth lens are meniscus lenses having concave surfaces facing the diaphragm; and
the following inequalities are satisfied:

$$0.6 \leq \left|\frac{R_6}{R_4}\right| \leq 1.0$$

where $R_4$ denotes the radius of curvature of the surface of the second lens facing the image side, and $R_6$ is the radius of curvature of the surface of the third lens facing the object; and $$1.1 \leq \frac{R_7}{R_8} < 3.5$$

where $R_7$ represents the radius of curvature of the surface of the third lens facing the image side, and $R_8$ represents the radius of curvature of the surface of the fourth lens facing the object side,
wherein the average value of the refractive indexes of the lenses that are located between the diaphragm and the image side is greater than the average value of the refractive indexes of the lenses that are located between the diaphragm and the object side.

3. The fixed focal length lens system of claim 2, wherein gaps exist between each of the first through fifth lenses.

4. The fixed focal length lens system of claim 2, wherein each of the refractive indexes of the lenses that are located between the diaphragm and the image side are greater than each of the refractive indexes of the lenses that are located between the diaphragm and the object side.

5. The fixed focal length lens system of claim 2, wherein a gap between the third lens and the fourth lens is greater at the center portion of an optical axis than at the peripheral portion away from the optical axis.

* * * * *